United States Patent
Di et al.

(10) Patent No.: US 12,276,048 B2
(45) Date of Patent: Apr. 15, 2025

(54) HIGH-POWER BIDIRECTIONAL-DRIVEN BIONIC MUSCLE FIBER AS WELL AS PREPARATION METHOD AND USE THEREOF

(71) Applicant: SUZHOU INSTITUTE OF NANO-TECH AND NANO-BIONICS (SINANO), CHINESE ACADEMY OF SCIENCES, Suzhou (CN)

(72) Inventors: Jiangtao Di, Suzhou (CN); Bo Cui, Suzhou (CN); Qingwen Li, Suzhou (CN)

(73) Assignee: SUZHOU INSTITUTE OF NANO-TECH AND NANO-BIONICS (SINANO), CHINESE ACADEMY OF SCIENCES, Suzhou (CN)

( * ) Notice: Subject to any disclaimer, the term of this patent is extended or adjusted under 35 U.S.C. 154(b) by 0 days.

(21) Appl. No.: 18/267,110

(22) PCT Filed: Nov. 4, 2022

(86) PCT No.: PCT/CN2022/129919
§ 371 (c)(1),
(2) Date: Jun. 14, 2023

(87) PCT Pub. No.: WO2024/016518
PCT Pub. Date: Jan. 25, 2024

(65) Prior Publication Data
US 2025/0011977 A1    Jan. 9, 2025

(30) Foreign Application Priority Data

Jul. 22, 2022 (CN) .................. 202210874035.2

(51) Int. Cl.
*D02G 3/44* (2006.01)
*C08G 75/045* (2016.01)
(Continued)

(52) U.S. Cl.
CPC .............. *D02G 3/44* (2013.01); *C08G 75/045* (2013.01); *C08J 5/243* (2021.05); *D02G 3/02* (2013.01);
(Continued)

(58) Field of Classification Search
CPC .. D02G 3/44; D02G 3/02; D02G 3/36; D02G 3/28; C08J 5/243; C08J 2381/02;
(Continued)

(56) References Cited

U.S. PATENT DOCUMENTS

2006/0041061 A1    2/2006  Naciri et al.

FOREIGN PATENT DOCUMENTS

| CN | 102990644 A | 3/2013 |
|---|---|---|
| CN | 108431065 A | 8/2018 |

(Continued)

OTHER PUBLICATIONS

Heino Finkelmann, et al., Investigations on Liquid Crystalline Polysiloxanes 3a), Liquid Crystalline Elastomers—A New Type of Liquid Crystalline Material b), Makromol. Chem., Rapid Commun., 1981, pp. 317-322, vol. 2.

(Continued)

*Primary Examiner* — Terrance L Kenerly
(74) *Attorney, Agent, or Firm* — Bayramoglu Law Offices LLC

(57) ABSTRACT

A high-power bidirectional-driven bionic muscle fiber as well as a preparation method and use thereof are provided. The bionic muscle fiber includes a matrix fiber and an object material layer coating the matrix fiber, where the matrix material is capable of emitting heat after electrification, and the object material layer includes a liquid crystal elastomer (LCE); the bionic muscle fiber is excessively twisted to form a helical barrel-like structure. The bionic muscle fiber provided by the present application improves the mechanical (Continued)

property of the LCE, shows large work capability and drive quantity, and has an realize rapid response and work at high frequency. The contraction of the fiber can be controlled by changing voltage. Furthermore, the bionic muscle fiber exhibits a bidirectional driving feature that can recover without stress. In addition, the cyclic work of the fiber is greater than zero.

14 Claims, 3 Drawing Sheets

(51) Int. Cl.
    *C08J 5/24*     (2006.01)
    *D02G 3/02*     (2006.01)
    *D02G 3/28*     (2006.01)
    *D02G 3/36*     (2006.01)
    *D06M 10/00*     (2006.01)
    *D06M 10/10*     (2006.01)
    *F03G 7/06*     (2006.01)
    *H02N 10/00*     (2006.01)
    *D06M 101/30*     (2006.01)
    *D06M 101/34*     (2006.01)
    *D06M 101/40*     (2006.01)

(52) U.S. Cl.
CPC ................. *D02G 3/28* (2013.01); *D02G 3/36* (2013.01); *D06M 10/001* (2013.01); *D06M 10/10* (2013.01); *F03G 7/0614* (2021.08); *H02N 10/00* (2013.01); *C08J 2381/02* (2013.01); *D06M 2101/30* (2013.01); *D06M 2101/34* (2013.01); *D06M 2101/40* (2013.01); *D10B 2101/12* (2013.01); *D10B 2331/02* (2013.01); *D10B 2331/14* (2013.01); *D10B 2401/00* (2013.01)

(58) Field of Classification Search
CPC .. F03G 7/0614; C08G 75/045; D06M 10/001; D06M 10/10; D06M 2101/30; D06M 2101/34; D06M 2101/40; H02N 10/00; D10B 2101/12; D10B 2331/02; D10B 2331/14; D10B 2401/00
See application file for complete search history.

(56) References Cited

FOREIGN PATENT DOCUMENTS

| | | |
|---|---|---|
| CN | 108454131 A | 8/2018 |
| CN | 111826765 A | 10/2020 |
| CN | 115142267 A | 10/2022 |
| WO | 2020163228 A1 | 8/2020 |
| WO | 2020231741 A2 | 11/2020 |

OTHER PUBLICATIONS

Jurgen Kupfer, et al., Nematic liquid single crystal elastomers, Makromol. Chem., Rapid Commun., 1991, pp. 717-726, vol. 12.
Donald L. Thomsen, et al., Liquid Crystal Elastomers with Mechanical Properties of a Muscle, Macromolecules, 2001, pp. 5868-5875, vol. 34, No. 17.

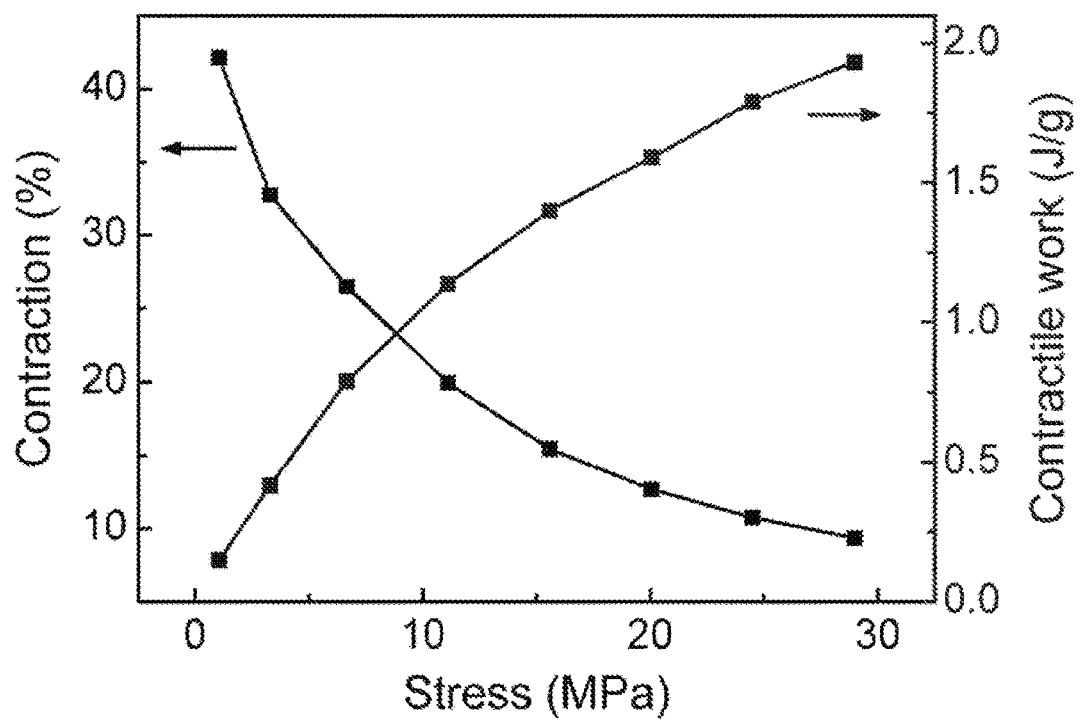
FIG. 5
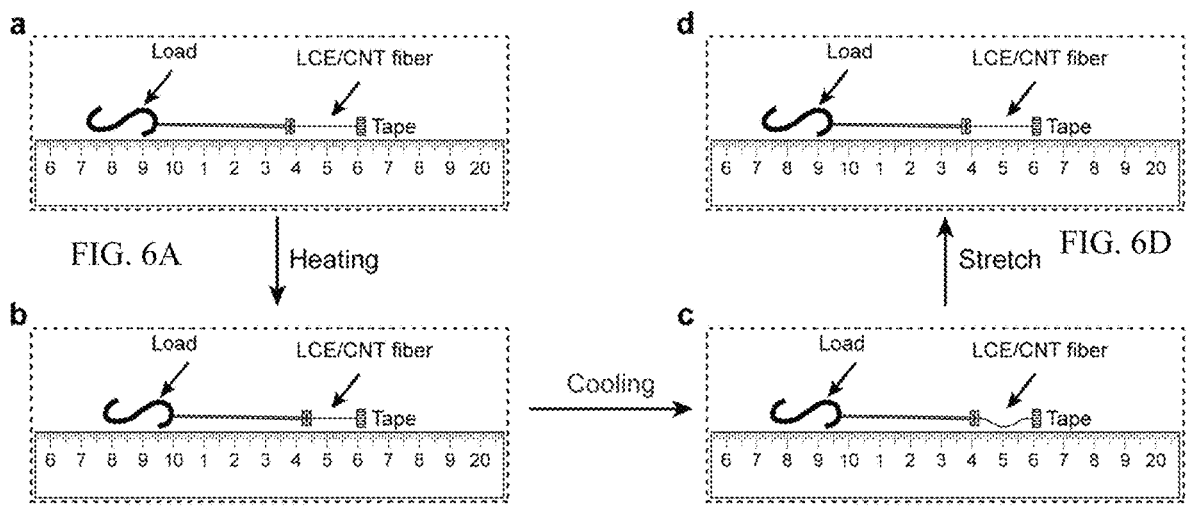
FIG. 6A
FIG. 6B
FIG. 6C
FIG. 6D

HIGH-POWER BIDIRECTIONAL-DRIVEN BIONIC MUSCLE FIBER AS WELL AS PREPARATION METHOD AND USE THEREOF

CROSS REFERENCE TO THE RELATED APPLICATIONS

This application is the national phase entry of International Application No. PCT/CN2022/129919, filed on Nov. 4, 2022, which is based upon and claims priority to Chinese Patent Application No. 202210874035.2, filed on Jul. 22, 2022, the entire contents of which are incorporated herein by reference.

TECHNICAL FIELD

The present application relates to the technical field of artificial muscles, particularly to a high-power bidirectional-driven bionic muscle fiber as well as a preparation method and use thereof.

BACKGROUND

With the development of science and technology, robots have gradually replaced manual work in some industrial fields. Most of the currently used robots are rigid robots, which are connected by rigid connectors and driven by motors. Such the rigid robot has the disadvantages of complex structure, low intelligence, poor environment adaptability, difficult miniaturization and the like, and therefore difficultly meets the diverse needs of robots in commercial, medical and rehabilitation fields.

To solve the problems existing in rigid robots, intelligent materials have attracted extensive attention. Intelligent materials are a class of materials with multiple functions including stimulus responsiveness, charge generating, transporting and/or storing ability, and biocompatibility. Where, lots of researches are made to shape memory materials that can produce different shape changes under periodical stimulation. Thanks to their excellent stimulus responsiveness and reversible shape change ability, different shape changes can be generated under different stimulations, thus the shape memory materials have important application prospects in the field of drivers. The currently researched shape memory materials mainly include alloys, ceramics, polymers, and gel, wherein shape memory polymers can realize multiple shape changes and have become the focus of people's research because of their lightweight and low cost.

At present, there are two kinds of shape memory polymers: a bidirectional shape memory polymer with reversible shape change (2 W-SMPs) and a unidirectional shape memory polymer with irreversible shape change (1 W-SMPs). The bidirectional shape memory polymer has advantages in practical applications due to reversible shape changes when being stimulated. The bidirectional shape memory polymer is divided into two types depending on the presence or absence of stress during the driving: shape memory polymer under stress condition and shape memory polymer under stress-free condition. The shape memory polymer that can be recovered to an original state after stimulation is removed under low stress or stress-free has a wider versatility, which is a hotspot and difficulty.

A liquid crystal elastomer (LCE), as a shape memory polymer, has been a research hotspot since its development. In 1981, Finkelmann et al synthesize the first batch of LCEs by two-step crosslinking; in 1991, they found LCE would change from a nematic phase to an isotropic phase when the single domain LCE was heated to a phase transition temperature, and LCE can achieve 26% contract along the direction of the liquid crystal molecule; subsequently, Thomsen et al proposed that nematic LCEs can exhibit muscle-like properties in 2001, which can provide the stress of 210 kPa and a strain of 35-45%, and have the features of bidirectional shape memory polymers.

Since then, people have studied the driving performance and shape change behavior of LCE with different reaction types and found that LCE has the advantages of high flexibility and large strain. However, the application of the LCE is seriously restricted due to complex synthesis, poor mechanical properties, and difficult large-scale preparation. Furthermore, most of the currently researched LCE have reversible shape changes only under the action of stress, thus it is a challenge for preparing LCE with bidirectional driving performance without stress.

In summary, the existing technology mainly has the defects that 1) a pure LCE has low mechanical strength, and therefore cannot meet large work demands and can not work under high frequency; 2) the current mainstream bionic muscle fibers have no bidirectional driving performance; 3) most of the currently researched bionic muscle fibers need loading all the time during the cycle, and the work done in the whole process is zero; 4) most of the thermally driven LCEs need to be driven by heating devices such as hot air guns, and therefore is serious in heat dissipation and uniform heating, which is not conducive to practical applications.

SUMMARY

In view of the defects in the prior art, the objective of the present application is to provide a high-power bidirectional-driven bionic muscle fiber, a preparation method and application. Particularly, provided is a new bionic muscle fiber having bidirectional driving performance, large power, rapid response speed, cycle work of greater than zero, and excellent driving performance.

To realize the above objective of the present disclosure, the technical solution adopted by the present application is as follows:

In the first aspect, the present application provides a high-power bidirectional-driven bionic muscle fiber, comprising a matrix fiber and an object material layer coating the matrix fiber, wherein the matrix material is capable of emitting heat when the voltage is applied, and the object material layer comprises an LCE; the bionic muscle fiber is excessively twisted to have a helical barrel-like structure.

In the second aspect, the present application also provides a preparation method for a bionic muscle fiber, comprising:

providing a matrix fiber capable of emitting heat after electrification and an object material precursor solution at least containing an LCE precursor;

coating the object material precursor solution on the surface of the matrix fiber to form a liquid film;

initiating the solidification reaction of the liquid film to form an object material layer on the surface of the matrix fiber to obtain a fiber precursor; and excessively twisting the fiber precursor so that the fiber precursor has a helical barrel-like structure to obtain the bionic muscle fiber.

In the third aspect, the present application also provides use of the above bionic muscle fiber in manufacturing drivers.

Based on the above technical solution, compared with the prior art, the present application at least has the following beneficial effects:

The bionic muscle fiber provided by the present application greatly improves the mechanical performance of LCE, and has a large work capacity and driving quantity; the bionic muscle fiber can realize fast response, work at high frequency, and the driving performance can be controlled by changing the voltage; moreover, the bionic muscle fiber can be restored into the initial state without loading, and the cycle work is greater than zero.

Meanwhile, in the preparation method of the bionic muscle fiber provided in the present application, a large number of LCEs are not needed, so as to save cost; furthermore, the preparation process is low in complexity and does not need harsh conditions, so as to solve the problems that the LCE fiber is complex to prepare and difficult to continuously prepare, which is conducive to development and application.

The above descriptions are only overviews of the technical solution of the present application. In order to make those skilled in the art more clearly understand the technical means of the present application and execute the technical means according to the content of the specification, illustration will be made according to preferred embodiments of the present application in combination with detailed drawings.

BRIEF DESCRIPTION OF THE DRAWINGS

FIG. 5 is a relationship test diagram of contraction rate and contraction work versus the stress of the bionic muscle fiber provided in a typical embodiment of the present application;

FIGS. 6A-6D are bidirectional driving performance test diagrams of a bionic muscle fiber provided in a typical embodiment of the present application.

DETAILED DESCRIPTION OF THE EMBODIMENTS

In view of the defects in the prior art, the inventors of this case put forward the technical solution of the present application after long-term research and extensive practice. Next, the technical solution, implementation process, and principle will be further explained and illustrated.

Many specific details are described in the following description to facilitate a full understanding of the present application. However, the present application can also be implemented in other ways different from those described here. Therefore, the protective scope of the present application is not limited by the specific embodiments disclosed below.

Figure 1:
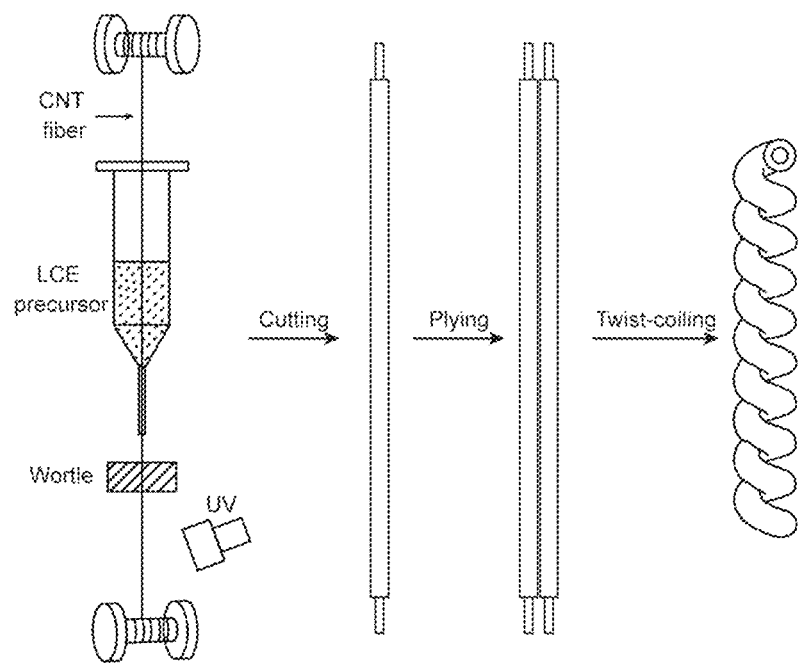
FIG. 1 is a schematic diagram of a preparation process of a bionic muscle fiber provided in a typical embodiment of the present application.
Figures 2A, 2B:
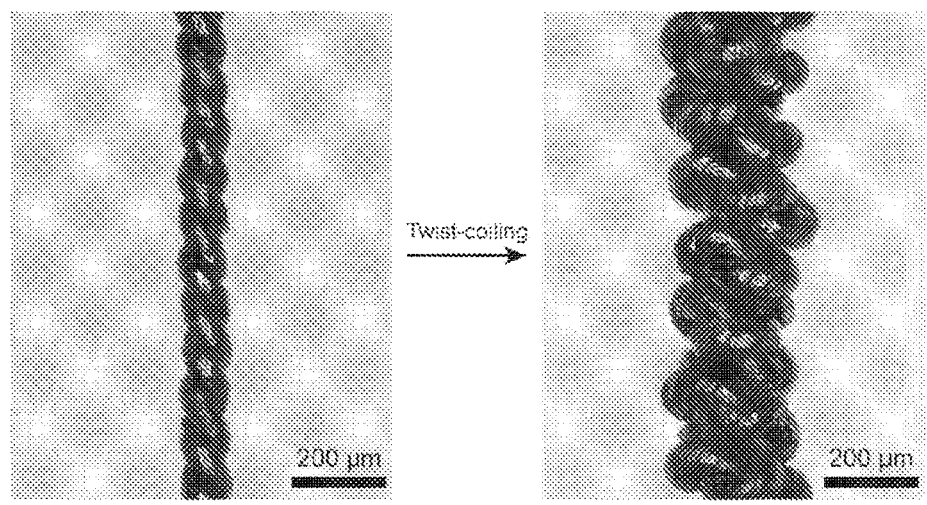
FIGS. 2A-2B are photographs of an over-twisting process of a bionic muscle fiber provided in a typical embodiment of the present application.

Referring to FIG. 1 and FIGS. 2A-2B, the embodiments of the present application provide a high-power bidirectional-driven bionic muscle fiber, comprising a matrix fiber and an object material layer coating the matrix fiber, wherein the matrix material is capable of emitting heat after electrification, and the object material layer comprises an LCE; the bionic muscle fiber is excessively twisted to have a helical barrel-like structure.

In the above technical solution, the LCE receives a tensile force along a twisting direction in the process of twisting, so that mesogen molecules inside the LCE realize a process from disorder to relative order, thus generating the driving performance; when the matrix fiber is heated by electrification and when the temperature is higher than the nematic to the isotropic phase transition temperature of the LCE, the fiber untwists owing to the LCE transformed from a nematic phase to an isotropic phase, and the mesogens of the LCE change from a relatively ordered state to a disordered state; at this moment, untwisting is restrained since the fiber is applied stress, so an untwisting force is converted into a contraction force to lift the load, realizing the contraction of the bionic muscle fiber.

Meanwhile, the applicant also find that the bionic muscle fiber provided by the present application also has bidirectional driving performance and a performance of work greater than zero, specifically, when current heating is removed and the temperature of the bionic muscle fiber recovers, the length of the bionic muscle fiber can be spontaneously recovered to an original length stress-free. In the whole process, the bionic muscle fiber pulls the load to work during the contraction and then recovered to an original state after thermal stimulation is lost, there is no need to apply the load during the recovery, and therefore the work done by the bionic muscle fibers is greater than zero in the cyclic process.

Where the object material layer at least comprises the LCE. The object material layer can only comprise the LCE, or additionally comprises other impurities or functional additives, such as solvents and initiators that are not completely removed. Meanwhile, the object material layer may comprise added polymers with toughening effect. All the similar situations as described above conform to the technical concept of the present application, and should also be included within the protective scope of the present application. The helical barrel-like structure is shown in FIGS. 2A-2B. The bionic muscle fiber is coiled into a structure similar to a spring. Such structure is caused by excessive twisting.

In the present application, the inventor has invented a new bidirectional-driven bionic muscle fiber based on an LCE composite material. Such the fiber shows a bidirectional driving feature and rapid response, and can achieve cyclic work greater than zero with a maximum work capacity of 1.9 J/g. In addition, the fiber can work and exhibit considerable contractile stroke under high frequencies. Therefore, the fiber has greater advantages in practical applications, and has wide application prospects in the fields of biomedical engineering and the like.

In some embodiments, the matrix fiber can comprise an electrothermal fiber and an optional insulating fiber; when the insulating fiber is provided, composite forms such as blending or plying of the electrothermal fiber and the insulating fiber can be selected. The electrothermal fiber refers to a fiber with certain conductivity and capable of heating after electrification.

In some embodiments, the electrothermal fiber comprises a combination of any one or more than two of a carbon nanotube fiber, a graphene fiber, a carbon fiber, a silver-plated nylon fiber, a silver wire, and a copper wire.

In some embodiments, the insulating fiber comprises a combination of any one or more than two of a cotton thread, a nylon fiber, a spandex fiber, an aramid fiber, a polyimide fiber, a polyester fiber, and a polyethylene fiber.

In some embodiments, the diameter of the matrix fiber is 50-500 μm, preferably 60 μm.

In some embodiments, the width of the object material layer is 1-20 μm, preferably about 1 μm.

In some embodiments, a mass ratio of the matrix fiber to the object material layer is 1:(3-12).

In some embodiments, the bionic muscle fiber is twisted in a single thread or multiple threads.

In some embodiments, the bionic muscle fiber is preferably twisted in double strands; the applicant finds that the bionic muscle fiber twisted in multiple threads has a higher driving quantity higher than the bionic muscle fiber twisted in 1-ply, furthermore, the bionic muscle fiber twisted in 2-ply has optimal driving quantity and other properties.

In some embodiments, the twist of the bionic muscle fiber can be 4000-6000 r/m, still preferably 5200 r/m.

In some embodiments, under the relaxed state of the bionic muscle fiber, the diameter of the helical barrel-like structure can be 50-200 μm, preferably about 100 μm. When the prepared spiral fiber is in a relaxed state, the pitches are close, referring to FIG. 2B.

Continue to refer to FIG. 1 and FIGS. 2A-2B, the embodiments of the present application further provide a preparation method for a bionic muscle fiber, comprising the following steps:

providing a matrix fiber capable of emitting heat after electrification and an object material precursor solution at least containing an LCE precursor;

coating the object material precursor solution on the surface of the matrix fiber to form a liquid film;

initiating the solidification reaction of the liquid film to form an object material layer on the surface of the matrix fiber to obtain a fiber precursor; and excessively twisting the fiber precursor so that the fiber precursor has a helical barrel-like structure to obtain the bionic muscle fiber.

Where the fiber matrix is not necessarily a conventional fiber with a circular cross-section or is a ribbon-shaped fiber. All slender fibers with a heating function can be used as the fiber matrix.

In some embodiments, a method for preparing the object precursor solution comprises:

heating a reaction system comprising a liquid crystal monomer, a chain extender, and an organic solvent for pre-reaction;

at least adding a catalyst, a cross-linking agent, and a photo initiator into the reaction system, and continuing heating to initiate Michael addition reaction to obtain the object material precursor solution.

Where the catalyst catalyzes the Michael addition reaction to prepare the LCE. The cross-linking agent acts in the Michael addition reaction to form a cross-linked network structure. The photo initiator can rapidly cure an oligomer generated in the previous reaction to form a polymer with a three-dimensional network structure during the UV curing. Heating can also play a role in removing a part of the solvent while initiating the Michael addition reaction for polymerization to form the object material precursor solution with high viscosity.

In some embodiments, the liquid crystal monomer can comprise a combination of any one or more than two of RM82 and MR257.

In some embodiments, the chain extender can comprise a combination of any one or more than two of allyl dithiol and 2,2'-(ethylenedioxy)diethanethiol.

In some embodiments, the catalyst can comprise a combination of any one or more than two of triethylamine, n-propylamine, and n-butylamine.

In some embodiments, the solidification reaction of the liquid film is initiated by UV irradiation.

In some embodiments, the preparation method can specifically comprise: the thickness of the matrix fiber coated with the liquid film is allowed to pass through a wire drawing die to control the thickness of the liquid film.

In some embodiments, the matrix fiber can have an initial twist, and the twisting direction of excessive twisting is the same as the chiral direction of the initial twist. The initial twist should not be excessively twisted, that is, no helical barrel-like structure is formed.

As some typical application examples of the above technical solution, the preparation method of the above bionic muscle fiber can be implemented by using the following steps:

The object material LCE precursor is prepared by using carbon nanotube (CNT) with high strength and high modulus as a composite fiber matrix and through thiol-acrylate Michael addition reaction reported in references.subsequently, a CNT/LCE composite fiber is continuously prepared by using a self-designed device as shown in FIG. 1. Then the LCE is cured by UV to obtain a CNT/LCE composite fiber with a core-shell structure. Finally, two threads of composite fibers are combined and then one end of the fiber suspends and loaded, and the other end of the fiber is fixed on the rotation shaft of the motor to be twisted, so as to finally obtain a helical fiber. Thermally driven bionic muscle fibers are completed by the above steps.

It should be noted that the purpose of the above self-designed device is to evenly and continuously coat the object material precursor solution on the fiber matrix. The main step is that a fiber matrix is immersed into the object material precursor solution, especially the object material precursor solution contained in a syringe, then a uniform liquid film is formed through the wire drawing die, and then cured by UV. The structure and composition of the above device are not intended to limit the technical solution of the present application. On the contrary, the same coating and curing effect can be also achieved by using other existing or otherwise designed coating devices. The replacement and modification of the preparation device should be included within the protective scope of the present application.

Based on the above technical solution, thanks to the excellent mechanical properties of the CNT, the mechanical property of the LCE has been greatly improved. The bionic muscle fiber formed by compounding the CNT and the LCE has large work ability. The large-scale continuous preparation of the composite fiber can be realized through the self-designed experimental device, thereby solving the problem that the LCE is complex and difficult to continuously prepare. Thanks to the high conductivity and electrothermal conversion performance of the CNT, the composite fiber can realize rapid response under the action of Joule heat, and the driving performance can be controlled by changing the voltage, so it can work at high frequencies. A helical fiber twisted by double threads has excellent driving performance with over 40% driving quantity. At present, most of the bionic muscle fibers need a load to recover their original lengths after contraction, and the cycle work is zero. Such the composite bionic muscle fiber can be recovered without load and has the bidirectional driving feature, and the cycle work is greater than zero.

The embodiment of the present application also provides use of the bionic muscle fiber provided by any one of the above embodiments or prepared by the above preparation method provided by any one of the above embodiments in manufacturing a driver. Further, the driver includes a robot driver, such as a robot manipulator drive and a facial expression drive unit. Of course, the driver is not limited to robots, and can also include a driving unit that is implanted into a human body to replace muscle operation, which can be applied to an artificial heart.

Next, the technical solution of the present application is further described in detail through several embodiments and in combination with the drawings. However, the selected embodiments are only for illustrating the present application but not limiting the scope of the present application.

Example 1

This example exemplifies a preparation process and performance test of a bionic muscle fiber, which are specifically as follows:

Step 1: the CNT ribbon prepared by a floating catalytic chemical vapor deposition method was used as an initial matrix, one end of the ribbon was fixed on a spinning machine, the ribbon was twisted by utilizing the spinning machine, and tens of meters of straight fibers were prepared by continuous twisting. As the matrix fiber, the straight fiber has a diameter of about 60 μm and was taken out for future use.

Step 2: an LCE as an object material was prepared by thiol-acrylate Michael addition reaction. Firstly, 0.8 mmol of liquid crystal monomer 1,4-bis-[4-(6-acryloyloxyhexyloxy)benzoyloxy]-2-methylbenzene (RM82) was dissolved into 3 mL of dichloromethane, then 1.0 mmol of chain extender 2,2'-(ethylenedioxy)diethanethiol (EDDT) was added into an RM82 solution, the above materials were uniformly mixed and maintained for 10 min at 80° C. for pre-reaction. After the pre-reaction, a 1 wt % catalyst triethylamine and 0.1 mmol of crosslinking agent pentaerythritol tetrakis(3-mercaptopropionate) (PETMP) were respectively added into the solution, then 2 wt % photo initiator2, 2-dimethoxy-2-phenylacetophenone (I-651) was added, and then the above materials were evenly mixed and then placed in a water bath pot to react for 3 h at 65° C. to finally obtain a viscous LCE precursor.

Step 3: the prepared LCE precursor solution was poured into a syringe connected with a CNT fiber and stood for 2 min, and then a collection device was started. The collection rate was 0.64 rpm. The CNT fiber continuously passed through the syringe connected with the CNT fiber and then passed through a 0.25 mm wire drawing die, so that the LCE was evenly coated onto the surface of the CNT fiber, and then cured under ultraviolet light, and finally the CNT/LCE composite fiber with a diameter of about 100 μm was collected.

Step 4: two ply CNT/LCE composite fibers with a length of 6 cm were arranged in parallel, then one end of the double-thread fiber was suspended on a motor, and the other end of the fiber was fixed with the load, the motor was turned on to maintain the same chirality as that in step 1 and twisted at a certain rotation speed until a helical structure was formed due to excessive twisting. The helical structure had an outer diameter of about 290 μm, the helical fiber has a diameter of 100 μm, that is, the bionic muscle fiber was prepared. Furthermore, several bionic muscle fibers with different threads of fiber were prepared by using similar methods (in which, the number of threads of fibers is different, the outer diameter and the diameter of the fiber can change, and the pitch is generally close to each other, as shown in FIGS. 2A-2B).

FIGS. 2A-2B are optical pictures of a process for preparing a bionic muscle fiber in this example. Two straight fibers are twisted in parallel to form a double-thread helical fiber with a diameter of about 100 μm, the LCE receives a tensile force along a twisting direction during the twisting, and the mesogen molecules inside the LCE realize a process from disorder to relative order, generating driving performance.

Figure 3:
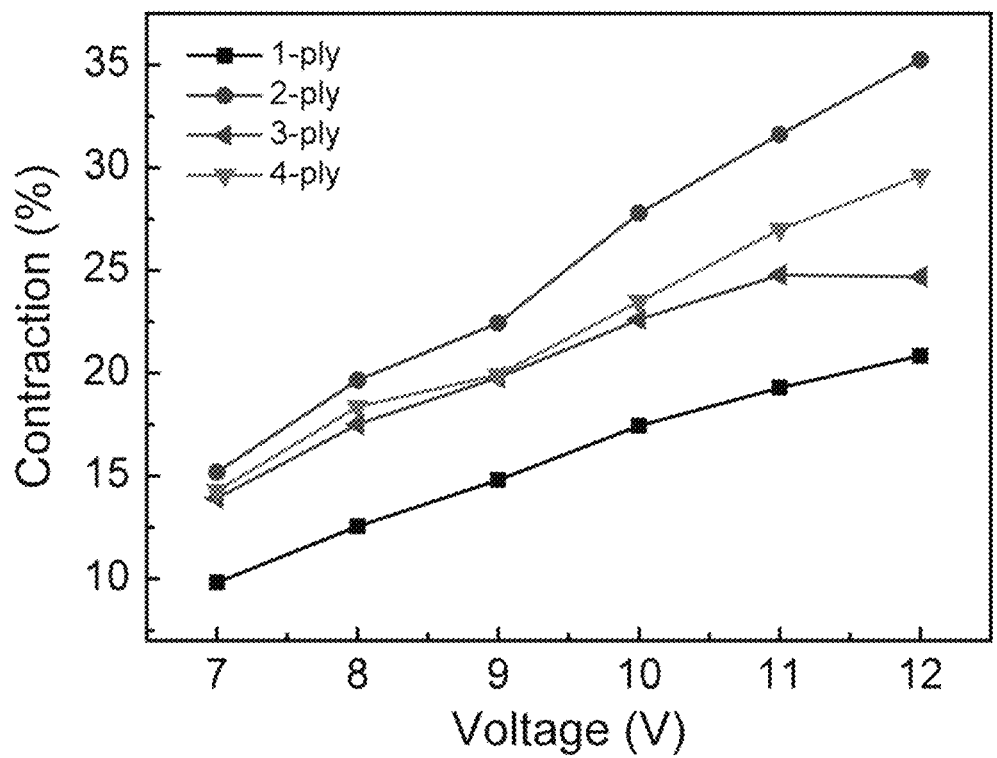
FIG. 3 is a driving performance test diagram of a bionic muscle fiber provided in a typical embodiment of the present application under different voltages.

FIG. 3 shows the driving performance of different threads of bionic muscle fibers prepared in this example under different voltages. When the voltage is applied, CNT generates Joule heat. When the temperature is higher than the nematic to the isotropic transition temperature of the LCE, the fiber untwists owing to the LCE transformed from the nematic phase to the isotropic phase, and the mesogens of the LCE change from a relatively ordered state to a disordered state. The untwisting is bound since the fiber is applied stress, so the untwisting force is converted into a contractive force to lift the load. It can be seen from FIG. 3 that the driving performance of the fiber gradually increases with the increase of the voltage, wherein the 2-ply bionic muscle fiber shows a great driving performance.

Figure 4:
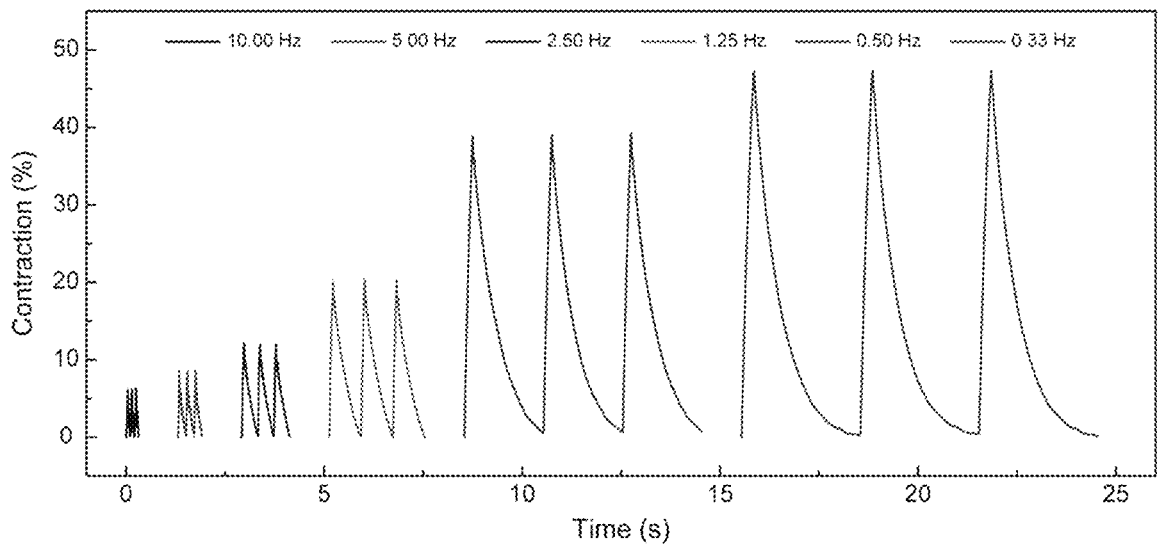
FIG. 4 is a driving performance test diagram of a bionic muscle fiber provided in a typical embodiment of the present application at different frequencies.

FIG. 4 shows the driving performance of a 2-ply composite bionic muscle fiber provided in this example under 0.83 MPa stress and 11 V voltage (10% duty cycle). It can be seen from FIG. 4 that the 2-ply composite fiber reached a contraction of 47% under 0.33 Hz, and the contraction rate reached about 156%/s, realizing a fast response. Meanwhile, the driving performance of the fiber decreases gradually with the increase of the frequency, which is because the heat generated by CNT reduces and the energy transferred to LCE is lower when the frequency increases, leading to a reduction in the driving performance of the fiber. The fiber has a contraction amount of about 6% at 10 Hz, indicating that this 2-ply composite fiber can work at high frequencies.

FIG. 5 shows a relationship between the contraction and contractile work versus the stress of the 2-ply composite fiber. The contraction of the fiber is gradually decreased with the increase of stress, and the contractile work is gradually increased. When the stress is about 29 MPa, the contractile work of the fiber is about 1.9 J/g, which is 47 times that of a skeletal muscle. Therefore, 2-ply composite fiber shows a large work capacity.

FIGS. 6A-6D show that the 2-ply fiber has bidirectional driving performance. The tail end of the fiber is connected with a weight, and the other end of the fiber is fixed. Subsequently, a voltage is applied, and the fiber pulls the weight to forward move after electrification. The fiber remains in the state shown in FIG. 6B immediately before the power is off. Then the fiber can be recovered to the original state stress-free shown in FIG. 6C. The fiber cannot push the weight back to the original position and remains in the state shown in FIG. 6C owing to the fiber is soft. After the fiber is slightly straightened by a hand, it is found that the length of the fiber recovered to the length before electrification, as shown in FIG. 6D. This indicates that the 2-ply helical fiber has bidirectional driving performance. In the whole process, the fiber pulls the weight to do work when it contracts and automatically recovered to its original length after the loss of thermal stimulation. The recovery of the fiber does not need weight, and therefore the work done by the fiber in a driving cycle is greater than zero.

Example 2

This example exemplifies a preparation process of a bionic muscle fiber, which is specifically as follows:
- Step 1: the CNT ribbon prepared by a floating catalytic chemical vapor deposition method was directly used as a matrix without twisting, and tens of meters of ribbon were installed in a preparation device for future use.
- Step 2: an LCE as a driving material was prepared by thiol-acrylate Michael addition reaction. Firstly, 0.8 mmol of 1,4-bis[4-(6-acryloyloxyhexyloxy)benzoyloxy]-2-methylbenzene (RM82) was dissolved into 3 mL of dichloromethane, then 1.0 mmol of 2,2'-(ethylenedioxy)diethanethiol (EDDT) was added into an RM82 solution, the above materials were uniformly mixed and maintained for 10 min at 80° C. for pre-reaction. After the pre-reaction, a 1 wt % catalyst triethylamine and 0.1 mmol of pentaerythritol tetrakis(3-mercaptopropionate) (PETMP) were respectively added into the solution, then 2 wt % photo initiator 2,2-dimethoxy-2-phenylacetophenone (I-651) was added, and then the above materials were evenly mixed and then placed in a water bath pot to react for 3 h at 65° C. to finally obtain a viscous LCE precursor.
- Step 3: the prepared LCE precursor solution was poured into a syringe connected with a CNT ribbon and stood for 2 min, and then a collection device was started. The collection rate was 0.64 rpm. The CNT ribbon continuously passed through the syringe equipped with the LCE and then passed through a 0.25 mm wire drawing die, and then cured under UV light, and finally the CNT/LCE composite ribbon was collected.
- Step 4: two CNT/LCE composite ribbons with a length of 6 cm were respectively twisted to form straight fibers but not excessively twisted, then arranged in parallel, then one end of the double-thread fiber was suspended on a motor, and the other end of the fiber was fixed with the load, the motor was turned on to maintain the same chirality as that when the straight fiber was formed by twisting, twisting was performed at a certain rotation speed until a helical structure was formed, so as to complete the preparation of the bionic muscle fiber.

Example 3

This example exemplifies a preparation process of a bionic muscle fiber, which is specifically as follows:
- Step 1: tens of meters of fibers were fixed on a device for preparing a composite fiber by using a graphene fiber as an initial matrix.
- Step 2: an LCE as an object material was prepared by thiol-acrylate Michael addition reaction. Firstly, 0.8 mmol of 1,4-bis-[4-(6-acryloyloxyhexyloxy)benzoyloxy]-2-methylbenzene (RM82) was dissolved into 3 mL of dichloromethane, then 1.0 mmol of 2,2'-(ethylenedioxy)diethanethiol (EDDT) was added into an RM82 solution, the above materials were uniformly mixed and maintained for 10 min at 80° C. for pre-reaction. After the pre-reaction, a 1 wt % catalyst triethylamine and 0.1 mmol of crosslinking agent pentaerythritol tetrakis(3-mercaptopropionate) (PETMP) were respectively added into the solution, then 2 wt % photo initiator 2,2-dimethoxy-2-phenylacetophenone (I-651) was added, and then the above materials were evenly mixed and then placed in a water bath pot to react for 3 h at 65° C. to finally obtain a viscous LCE precursor.
- Step 3: the prepared LCE precursor solution was poured into a syringe connected with a graphene fiber and stood for 2 min, and then a collection device was started. The collection rate was 0.64 rpm. The graphene fiber continuously passed through the syringe equipped with the LCE and then passed through a 0.25 mm wire drawing die so that the LCE was coated onto the surface of the graphene fiber, and then cured under ultraviolet light, and finally the graphene/LCE composite fiber was collected.
- Step 4: two graphene/LCE composite fibers with a length of 6 cm were arranged in parallel, then one end of the double-thread fiber was suspended on a motor, and the other end of the fiber was fixed with the load, the motor was turned on to maintain the same chirality as that when twisting was performed at a certain rotation speed until a helical structure was formed, so as to complete the preparation of the bionic muscle fiber.

Example 4

This example exemplifies a preparation process of a bionic muscle fiber, which is specifically as follows:
- Step 1: tens of meters of carbon fibers were fixed on a device for preparing a composite fiber by using carbon fiber as a matrix for future use.
- Step 2: an LCE as an object material was prepared by thiol-acrylate Michael addition reaction. Firstly, 0.8 mmol of 1,4-bis-[4-(6-acryloyloxyhexyloxy)benzoyloxy]-2-methylbenzene (RM82) was dissolved into 3 mL of dichloromethane, then 1.0 mmol of 2,2'-(ethylenedioxy)diethanethiol (EDDT) was added into an RM82 solution, the above materials were uniformly mixed and maintained for 10 min at 80° C. for pre-reaction. After the pre-reaction, a 1 wt % catalyst triethylamine and 0.1 mmol of crosslinking agent pentaerythritol tetrakis(3-mercaptopropionate) (PETMP) were respectively added into the solution, then 2 wt % photo initiator 2,2-dimethoxy-2-phenylacetophenone (I-651) was added, and then the above materials were evenly mixed and then placed in a water bath pot to react for 3 h at 65° C. to finally obtain a viscous LCE precursor.
- Step 3: the prepared LCE precursor solution was poured into a syringe connected with a carbon fiber and stood for 2 min, and then a collection device was started. The collection rate was 0.64 rpm. The carbon fiber continuously passed through the syringe equipped with the LCE and then passed through a 0.25 mm wire drawing die, and then cured under ultraviolet light, finally, the carbon fiber/LCE composite fiber was collected.
- Step 4: two carbon fiber/LCE composite fibers with a length of 6 cm were arranged in parallel, then one end of the double-thread fiber was suspended on a motor, and the other end of the fiber was fixed with the load, the motor was turned on to maintain the same chirality as that of the carbon fiber, and twisting was performed at a certain rotation speed until a helical structure was formed, so as to complete the preparation of the bionic muscle fiber.

Example 5

This example exemplifies a preparation process of a bionic muscle fiber, which is specifically as follows:

Step 1: tens of meters of polyimide fibers were fixed on a device for preparing a composite fiber by using a copper-plated polyimide fiber as a matrix for future use.

Step 2: an LCE as an object material was prepared by thiol-acrylate Michael addition reaction. Firstly, 0.8 mmol of 1,4-bis-[4-(6-acryloyloxyhexyloxy)benzoyloxy]-2-methylbenzene (RM82) was dissolved into 3 mL of dichloromethane, then 1.0 mmol of 2,2'-(ethylenedioxy)diethanethiol (EDDT) was added into an RM82 solution, the above materials were uniformly mixed and maintained for 10 min at 80° C. for pre-reaction. After the pre-reaction, a 1 wt % catalyst triethylamine and 0.1 mmol of crosslinking agent pentaerythritol tetrakis(3-mercaptopropionate) (PETMP) were respectively added into the solution, then 2 wt % photo initiator 2,2-dimethoxy-2-phenylacetophenone (I-651) was added, and then the above materials were evenly mixed and then placed in a water bath pot to react for 3 h at 65° C. to finally obtain a viscous LCE precursor.

Step 3: the prepared LCE precursor solution was poured into a syringe connected with a polyimide fiber and stood for 2 min, and then a collection device was started. The collection rate was 0.64 rpm. The polyimide fiber continuously passed through the syringe equipped with the LCE and then passed through a 0.25 mm wire drawing die so that the LCE was coated onto the surface of the polyimide fiber, and then cured under ultraviolet light, and finally the polyimide/LCE composite fiber was collected.

Step 4: two polyimide/LCE composite fibers with a length of 6 cm were arranged in parallel, then one end of the double-thread fiber was suspended on a motor, and the other end of the fiber was fixed with the load, the motor was turned on and twisting was performed at a certain rotation speed until a helical structure was formed, so as to complete the preparation of the bionic muscle fiber.

Example 6

This example exemplifies a preparation process of a bionic muscle fiber, which is specifically as follows:

Step 1: tens of meters of nylon fibers were fixed on a device for preparing a composite fiber by using a silver-plated nylon fiber as a matrix for future use.

Step 2: an LCE as an object material was prepared by thiol-acrylate Michael addition reaction. Firstly, 0.8 mmol of 1,4-bis-[4-(6-acryloyloxyhexyloxy)benzoyloxy]-2-methylbenzene (RM82) was dissolved into 3 mL of dichloromethane, then 1.0 mmol of 2,2'-(ethylenedioxy)diethanethiol (EDDT) was added into an RM82 solution, the above materials were uniformly mixed and maintained for 10 min at 80° C. for pre-reaction. After the pre-reaction, a 1 wt % catalyst triethylamine and 0.1 mmol of crosslinking agent pentaerythritol tetrakis(3-mercaptopropionate) (PETMP) were respectively added into the solution, then 2 wt % photo initiator 2,2-dimethoxy-2-phenylacetophenone (I-651) was added, and then the above materials were evenly mixed and then placed in a water bath pot to react for 3 h at 65° C. to finally obtain a viscous LCE precursor.

Step 3: the prepared LCE precursor solution was poured into a syringe connected with a nylon fiber and stood for 2 min, and then a collection device was started. The collection rate was 0.64 rpm. The nylon fiber continuously passed through the syringe equipped with the LCE and then passed through a 0.25 mm wire drawing die, and then cured under ultraviolet light. Finally, the nylon/LCE composite fiber was collected.

Step 4: two nylon/LCE composite fibers with a length of 6 cm were arranged in parallel, then one end of the double-thread fiber was suspended on a motor, and the other end of the fiber was fixed with the load, the motor was turned on to maintain the same chirality as that of nylon, and twisting was performed at a certain rotation speed until a helical structure was formed, so as to complete the preparation of the bionic muscle fiber.

The bionic muscle fibers obtained in examples 2-6 were subjected to driving quantity high-frequency performance, and cyclic work tests by using the same test method as that in example 1. It can be found that the bionic muscle fibers obtained in examples 2-6 have the same various performances as those in example 1. Due to the limitations of this article, we will not repeat them here.

Based on the above detection results, it can be clarified that the bionic muscle fiber provided in the embodiments of the present application greatly improves the mechanical properties of the LCE. The fiber shows a large work capacity, fast contraction and it can work at high frequency. Moreover, the driving performance of the fiber can be controlled by changing the voltage. In addition, the bionic muscle fiber that can be recovered to the initial state without load exhibits bidirectional driving features, and the cycle work is greater than zero.

Meanwhile, the preparation method of the bionic muscle fiber provided by the embodiment of the application does not need a large number of LCEs, which saves costs. Furthermore, the preparation process is low in complexity and does not need harsh conditions, solving the problems that that the liquid crystal elastomer is complex to prepare and difficult to continuously prepare, which is conducive to development and application.

It should be understood that the above embodiments are only for illustrating the technical concept and features of the present application, and are intended to make those skilled in the art can understand the content of the present application to accordingly implement the present application, and cannot thereby limit the protective scope of the present application. Any equivalent changes or modifications made according to the spirit of the present application shall be included within the protective scope of the present application.

What is claimed is:

1. A high-power bidirectional-driven bionic muscle fiber, comprising a matrix fiber and an object material layer coating the matrix fiber, wherein,
   the matrix fiber is configured for emitting a heat after an electrification, and the object material layer coating the matrix fiber comprises a liquid crystal elastomer (LCE);
   the high-power bidirectional-driven bionic muscle fiber is twisted to have a helical barrel-like structure.

2. The high-power bidirectional-driven bionic muscle fiber according to claim 1, wherein the matrix fiber comprises an electrothermal fiber, and wherein an insulating fiber is selectively added or not added to the matrix fiber;
   wherein the electrothermal fiber comprises a combination of any one or more than two of a carbon nanotube fiber (CNT), a graphene fiber, a carbon fiber, a silver-plated nylon fiber, a silver wire, and a copper wire; and
   wherein the insulating fiber comprises a combination of any one or more than two of a cotton thread, a nylon fiber, a spandex fiber, an aramid fiber, a polyimide fiber, a polyester fiber, and a polyethylene fiber.

3. The high-power bidirectional-driven bionic muscle fiber according to claim 1, wherein a diameter of the matrix fiber is 50-500 μm;
and/or, a width of the object material layer coating the matrix fiber is 1-20 μm;
wherein a mass ratio of the matrix fiber to the object material layer coating the matrix fiber is 1:(3-12).

4. The high-power bidirectional-driven bionic muscle fiber according to claim 1, wherein the high-power bidirectional-driven bionic muscle fiber is twisted
wherein the bionic muscle fiber is twisted in double strands; and
wherein a twist of the high-power bidirectional-driven bionic muscle fiber is 4000-6000 r/m.

5. The high-power bidirectional-driven bionic muscle fiber according to claim 4, wherein under a relaxed state of the high-power bidirectional-driven bionic muscle fiber, a diameter of the helical barrel-like structure is 50-200 μm.

6. A preparation method of a bionic muscle fiber, comprising:
providing a matrix fiber configured for emitting a heat after an electrification and an object material precursor solution at least containing an LCE precursor;
coating the object material precursor solution on a surface of the matrix fiber to form a liquid film;
initiating a solidification reaction of the liquid film to form an object material layer on the surface of the matrix fiber to obtain a fiber precursor; and
twisting the fiber precursor so that the fiber precursor has a helical barrel-like structure to obtain the bionic muscle fiber.

7. The preparation method according to claim 6, wherein a method for preparing the object material precursor solution comprises:
heating a reaction system comprising a liquid crystal monomer, a chain extender, and an organic solvent for a pre-reaction; and
at least adding a catalyst, a cross-linking agent, and a photoinitiator into the reaction system, and continuing heating to initiate a Michael addition reaction to obtain the object material precursor solution;
wherein the liquid crystal monomer comprises a combination of any one or more than two of RM82 and MR257;
and/or, the chain extender comprises a combination of any one or more than two of allyl dithiol and 2,2'-(ethylenedioxy)diethanethiol;
and/or, the catalyst comprises a combination of any one or more than two of triethylamine, n-propylamine, and n-butylamine.

8. The preparation method according to claim 7, wherein the solidification reaction of the liquid film is initiated by a UV irradiation.

9. The preparation method according to claim 6, wherein the matrix fiber has an initial twist, and a twisting direction of the excessively twisting is the same as a chiral direction of the initial twist.

10. A manufacturing driver comprising the high-power bidirectional-driven bionic muscle fiber according to claim 1.

11. The use according to claim 10, wherein the matrix fiber comprises an electrothermal fiber, and wherein an insulating fiber is selectively added or not added to the matrix fiber;
wherein the electrothermal fiber comprises a combination of any one or more than two of a carbon nanotube fiber (CNT), a graphene fiber, a carbon fiber, a silver-plated nylon fiber, a silver wire, and a copper wire;
wherein the insulating fiber comprises a combination of any one or more than two of a cotton thread, a nylon fiber, a spandex fiber, an aramid fiber, a polyimide fiber, a polyester fiber, and a polyethylene fiber.

12. The use according to claim 10, wherein a diameter of the matrix fiber is 50-500 μm;
and/or, a width of the object material layer coating the matrix fiber is 1-20 μm;
wherein a mass ratio of the matrix fiber to the object material layer coating the matrix fiber is 1:(3-12).

13. The use according to claim 10, wherein the high-power bidirectional-driven bionic muscle fiber is twisted;
wherein the bionic muscle fiber is twisted in double strands; and
wherein a twist of the high-power bidirectional-driven bionic muscle fiber is 4000-6000 r/m.

14. The use according to claim 13, wherein under a relaxed state of the high-power bidirectional-driven bionic muscle fiber, a diameter of the helical barrel-like structure is 50-200 μm.

* * * * *